United States Patent
Lin

(10) Patent No.: US 10,992,843 B2
(45) Date of Patent: Apr. 27, 2021

(54) VIDEO INTERFACE CONVERSION APPARATUS AND OPERATION METHOD THEREOF

(71) Applicant: Novatek Microelectronics Corp., Hsinchu (TW)

(72) Inventor: Wen-Chi Lin, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/917,867

(22) Filed: Mar. 12, 2018

(65) Prior Publication Data

US 2019/0068843 A1 Feb. 28, 2019

Related U.S. Application Data

(60) Provisional application No. 62/551,213, filed on Aug. 28, 2017.

(51) Int. Cl.
*H04N 5/10* (2006.01)
*H04N 7/01* (2006.01)
(Continued)

(52) U.S. Cl.
CPC ............... *H04N 5/10* (2013.01); *G09G 5/005* (2013.01); *G09G 5/006* (2013.01); *G09G 5/008* (2013.01);
(Continued)

(58) Field of Classification Search
CPC .......... H04N 5/10; H04N 5/04; H04N 7/0127; H04N 5/765; G09G 5/006; G09G 5/026;
(Continued)

(56) References Cited

U.S. PATENT DOCUMENTS 4,872,054 A * 10/1989 Gray ..................... G09G 1/285
   348/441
5,185,603 A * 2/1993 Medin ..................... G09G 5/12
   345/213
(Continued)

FOREIGN PATENT DOCUMENTS

CN   101394181   3/2009
CN   101710997   5/2010

OTHER PUBLICATIONS

"Office Action of China Counterpart Application", dated Jul. 20, 2020, p. 1-p. 15.

*Primary Examiner* — Jefferey F Harold
*Assistant Examiner* — Humam M Satti
(74) *Attorney, Agent, or Firm* — JCIPRNET

(57) ABSTRACT

A video interface conversion apparatus comprises a video interface circuit, a video clock adjustment information generation circuit and a video clock recovery circuit. The video interface circuit generates at least one original synchronization signal according to a control signal, and fetches video data from a data signal according to a video synchronization signal. The video clock adjustment information generation circuit generates video clock adjustment information and the video synchronization signal according to the original video synchronization signal and a video clock. The video clock recovery circuit receives an original clock and the video clock adjustment information, and recovers the video clock by adjusting the original clock according to the video clock adjustment information.

12 Claims, 9 Drawing Sheets

(51) Int. Cl.
*H04N 5/04* (2006.01)
*G09G 5/00* (2006.01)
*G09G 5/02* (2006.01)
*G09G 5/14* (2006.01)

(52) U.S. Cl.
CPC ............... *G09G 5/026* (2013.01); *G09G 5/14* (2013.01); *H04N 5/04* (2013.01); *H04N 7/0127* (2013.01); *G09G 2370/10* (2013.01); *G09G 2370/12* (2013.01)

(58) Field of Classification Search
CPC .......... G09G 5/005; G09G 5/008; G09G 5/14; G09G 2370/12; G09G 2370/10
See application file for complete search history.

(56) References Cited

U.S. PATENT DOCUMENTS

| | | | | |
|---|---|---|---|---|
| 6,177,922 | B1* | 1/2001 | Schiefer | G09G 5/005 345/698 |
| 6,333,750 | B1* | 12/2001 | Odryna | G06F 3/1431 345/629 |
| 8,462,268 | B2* | 6/2013 | Ryan | H04N 21/440281 348/512 |
| 2003/0107673 | A1* | 6/2003 | Sato | H04N 5/10 348/529 |
| 2005/0052577 | A1* | 3/2005 | Seth-Smith | H04N 7/0122 348/542 |
| 2005/0195326 | A1* | 9/2005 | Kudou | H04N 7/035 348/465 |
| 2006/0077288 | A1* | 4/2006 | Wu | G06T 3/40 348/441 |
| 2007/0182850 | A1* | 8/2007 | Chon | H04N 5/04 348/521 |
| 2011/0175866 | A1* | 7/2011 | Uehara | H03L 7/18 345/204 |
| 2012/0026156 | A1* | 2/2012 | Chen | G09G 5/005 345/214 |
| 2015/0109531 | A1* | 4/2015 | Nishio | H04N 21/4305 348/537 |
| 2015/0116594 | A1* | 4/2015 | Chuang | H04N 21/4305 348/495 |
| 2015/0288919 | A1* | 10/2015 | Labosco | G09G 5/008 348/445 |
| 2018/0035018 | A1* | 2/2018 | Yamada | G09G 5/006 |

\* cited by examiner

VIDEO INTERFACE CONVERSION APPARATUS AND OPERATION METHOD THEREOF

CROSS-REFERENCE TO RELATED APPLICATION

This application claims the priority benefit of U.S. provisional application Ser. No. 62/551,213, filed on Aug. 28, 2017. The entirety of the above-mentioned patent application is hereby incorporated by reference herein and made a part of this specification.

BACKGROUND

Field of the Invention

The invention relates to a video apparatus and more particularly, to a video interface conversion apparatus and an operation method thereof.

Description of Related Art

In a scenario where two electronic apparatuses have different video interface standards, one of the electronic apparatuses may transmit a video stream to the other electronic apparatus through a video interface conversion apparatus. As different video synchronization signals complying with different video interface standards have different definitions, and/or different video interface standards correspond to different clocks. Thus, a general type video interface conversion apparatus usually, when converting a video synchronization signal (e.g., a horizontal synchronization signal Hsync and/or a vertical synchronization signal Vsync) between output interfaces, encounters a residual issue.

The residual issue refers to a scenario that in one video frame, a period length of the horizontal synchronization signal Hsync of the last line is different from a period length of the horizontal synchronization signal Hsync of any other lines in the video frame. Taking a DisplayPort (DP) interface served as a video input interface of the video interface conversion apparatus for example, the residual issue is resulted from the feature of the DP interface where the video synchronization signal (e.g., Hsync and/or Vsync) is defined in a packet approach. According to the DP interface standard, the video synchronization signal of the DP interface is defined within a main stream attribute (MSA) packet and further defined in an "LS_CLK" unit in the packet. If a video output interface of the video interface conversion apparatus is another video interface complying with another standard (e.g., HDMI, Vx1 or VGA), this video interface may define the video synchronization signal in a "Video Clock" unit. Despite that, the "LS_CLK" and the "Video Clock" units have two asynchronous clocks. Due to the "LS_CLK" and the "Video Clock" units having two asynchronous clocks, an asynchronous deviation may occur when the video synchronization signal is transmitted from the "LS_CLK" unit to the "Video CLK" unit. Once such deviation is accumulated to a certain degree along with time, it will result in video data error.

SUMMARY

The invention provides a video interface conversion apparatus and an operation method thereof capable of mitigating the residual issue which occurs during a process of the conversion between different video interfaces.

According to an embodiment of the invention, a video interface conversion apparatus is provided. The video interface conversion apparatus includes a first video interface physical layer circuit, a first video interface link layer circuit, a video clock adjustment information generation circuit, a video clock recovery circuit and a second video interface link layer circuit. The first video interface physical layer circuit is configured to fetch original data and an original clock. The first video interface link layer circuit is coupled to the first video interface physical layer circuit to receive the original data and the original clock. The first video interface link layer circuit is configured to perform a first video interface link layer process on the original data according to the original clock to obtain a data signal and a control signal. The first video interface link layer circuit generates at least one original synchronization signal according to the control signal and fetches video data from the data signal according to a video synchronization signal. The video clock adjustment information generation circuit generate video clock adjustment information and the video synchronization signal according to the original synchronization signal and a video clock. The video clock recovery circuit is coupled to the first video interface physical layer circuit to receive the original clock. The video clock recovery circuit is configured to recover the video clock by adjusting the original video clock according to the video clock adjustment information. The second video interface link layer circuit is coupled to the first video interface link layer circuit to receive the video data and the video synchronization signal. The second video interface link layer circuit is coupled to the video clock recovery circuit to receive the video clock. The second video interface link layer circuit is configured to perform a second video interface link layer process on the video data according to the video clock and the video synchronization signal.

According to an embodiment of the invention, a video interface conversion apparatus is further provided. The video interface conversion apparatus includes a video interface circuit, a video clock adjustment information generation circuit and a video clock recovery circuit. The video interface circuit is configured to generate at least one original synchronization signal according to a control signal and fetch video data from a data signal according to a video synchronization signal. The video clock adjustment information generation circuit is configured to generate video clock adjustment information and the video synchronization signal according to the original video synchronization signal and a video clock. The video clock recovery circuit receives an original clock and the video clock adjustment information. The video clock recovery circuit is configured to recover the video clock by adjusting the original clock according to the video clock adjustment information.

According to an embodiment of the invention, an operation method of a video interface conversion apparatus is further provided. The operation method includes: fetching original data and an original clock by a first video interface physical layer circuit; performing a first video interface link layer process on the original data according to the original clock to obtain a data signal and a control signal by a first video interface link layer circuit; generating at least one original synchronization signal according to the control signal by the first video interface link layer circuit; generating video clock adjustment information and a video synchronization signal according to the original synchronization signal and a video clock by the video clock adjustment information generation circuit; fetching video data from the data signal according to the video synchronization signal by the first video interface link layer circuit; recovering the video clock by adjusting the video clock according to the video clock adjustment information by a video clock recovery circuit; and performing a second video interface link layer process on the video data according to the video clock and the video synchronization signal by a second video interface link layer circuit.

According to an embodiment of the invention, an operation method of a video interface conversion apparatus is further provided. The operation method includes: generating at least one original synchronization signal according to a control signal and fetching video data from a data signal according to a video synchronization signal by a video interface circuit; generating video clock adjustment information and the video synchronization signal according to the original video synchronization signal and a video clock by a video clock adjustment information generation circuit; and recovering the video clock by adjusting the original clock according to the video clock adjustment information by a video clock recovery circuit According to an embodiment of the invention, an operation method of a video interface conversion apparatus is further provided. The operation method includes: generating an original video synchronization signal by a first video interface link layer circuit; generating video clock adjustment information according to the original video synchronization signal and a video clock by a video clock adjustment information generation circuit; recovering the video clock by adjusting the original clock according to the video clock adjustment information by a video clock recovery circuit; and providing the video clock to a second video interface link layer circuit.

Based on the above, in the video interface conversion apparatus and the operation method thereof provided by the embodiments of the invention, the video clock adjustment information generation circuit generates the video clock adjustment information to the video clock recovery circuit according to the original synchronization signal and the video clock. The video clock recovery circuit recovers the video clock by adjusting the original clock according to the video clock adjustment information. Thus, the period length of the recovered video clock can dynamically respond to the period length of the original clock, so as to mitigate the residual issue which occurs during the process of the conversion between different video interfaces.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
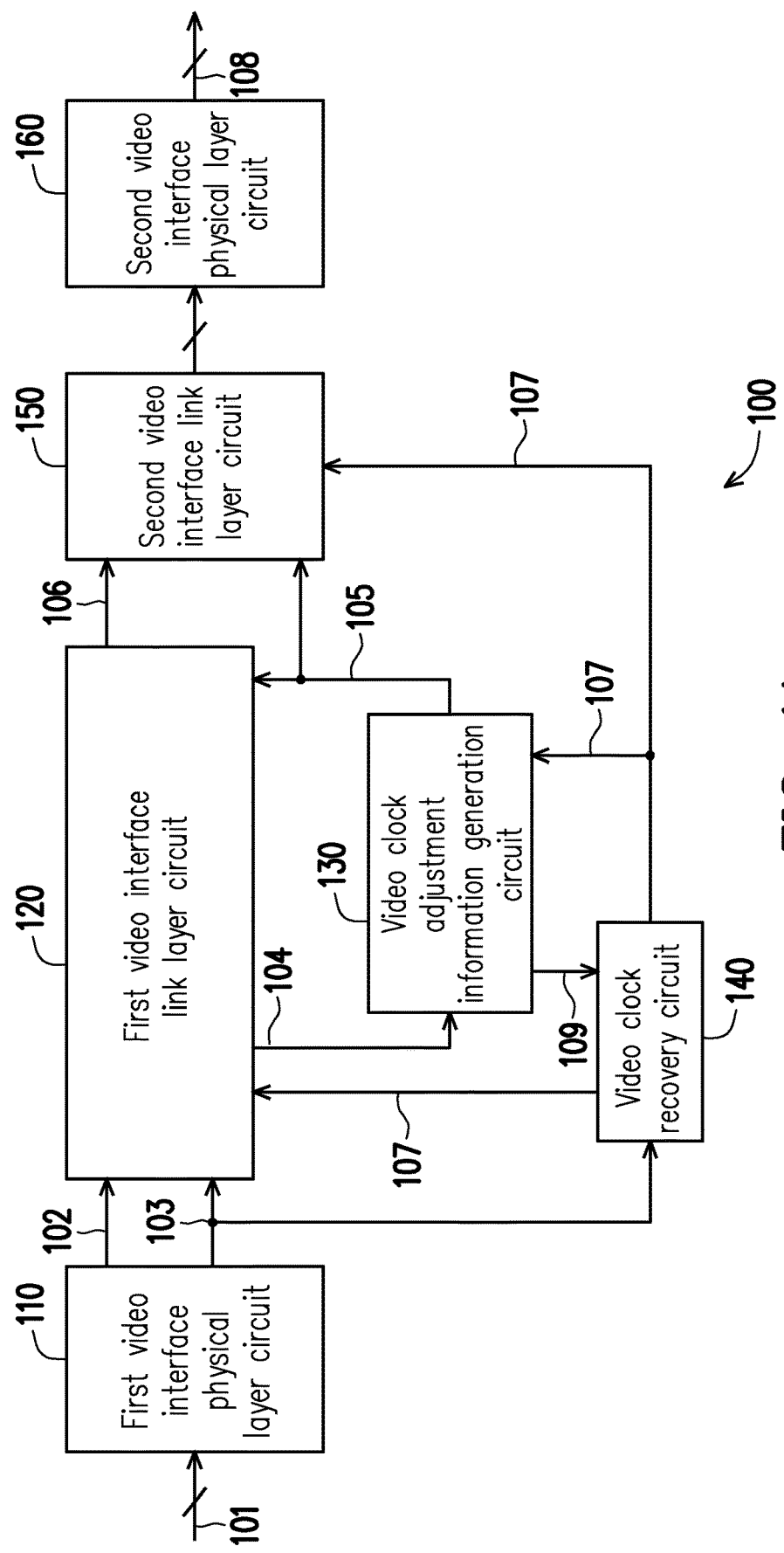
FIG. 1A to FIG. 1C are schematic circuit block diagrams illustrating a video interface conversion apparatus according to different embodiments of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

FIG. 1A is a schematic circuit block diagram illustrating a video interface conversion apparatus 100 according to an embodiment of the invention. The video interface conversion apparatus 100 includes a first video interface physical layer circuit 110, a first video interface link layer circuit 120, a video clock adjustment information generation circuit 130, a video clock recovery circuit 140, a second video interface link layer circuit 150 and a second video interface physical layer circuit 160. The first video interface physical layer circuit 110 and the first video interface link layer circuit 120 may be circuits complying with a first video interface standard, while the second video interface link layer circuit 150 and the second video interface physical layer circuit 160 may be circuits complying with a second video interface standard. The first video interface standard and the second video interface standard may be determined according to a design requirement. For instance, the first video interface standard may be a DisplayPort (DP) interface standard, and/or the second video interface standard may be a High Definition Multimedia Interface (HDMI) standard.

The first video interface physical layer circuit 110 may fetch original data 102 and an original clock 103, for example, from a packet stream 101. The implementation of the first video interface physical layer circuit 110 may be determined according to a design requirement. For instance, the first video interface physical layer circuit 110 may be a conventional physical layer circuit complying with the DP interface standard (or other interface standards) or any other physical layer circuit/element.

The first video interface link layer circuit 120 (which is a video interface circuit) is coupled to the first video interface physical layer circuit 110 to receive the original data 102 and the original clock 103. The first video interface link layer circuit 120 is coupled to the video clock adjustment information generation circuit 130 to receive a video synchronization signal 105. The first video interface link layer circuit 120 is coupled to the video clock recovery circuit 140 to receive a video clock 107. The first video interface link layer circuit 120 may perform a first video interface link layer process on the original data 102 according to the original clock 103 to obtain a data signal and a control signal. The implementation detail of the first video interface link layer process may be determined according to a design requirement. For instance, the first video interface link layer process may be a conventional link layer process complying with the DP interface standard (or other interface standards) or any other link layer process. The first video interface link layer circuit 120 generates at least one original synchronization signal 104 according to the control signal. According to a design requirement, the original synchronization signal 104 may be a data enable signal, a horizontal synchronization signal and/or a vertical synchronization signal. According to the video synchronization signal 105 provided by the video clock adjustment information generation circuit 130, the first video interface link layer circuit 120 may fetch video data 106 from the data signal and provide the video data 106 to the second video interface link layer circuit 150. In some embodiments where the first video interface link circuit 120 is integrated with the video clock adjustment information generation circuit 130 which generates the video synchronization signal 105, the first video interface link layer circuit 120 may also provide the video synchronization signal 105 to the second video interface link layer circuit 150.

The second video interface link layer circuit 150 is coupled to the first video interface link layer circuit 120 to receive the video data 106. The second video interface link layer circuit 150 is coupled to the video clock adjustment information generation circuit 130 to receive the video synchronization signal 105. The second video interface link layer circuit 150 is coupled to the video clock recovery circuit 140 to receive the video clock 107. The second video interface link layer circuit 150 may perform a second video interface link layer process on the video data 106 according to the video clock 107 and the video synchronization signal 105 to generate second data and a second clock to the second video interface physical layer circuit 160. The implementation detail of the second video interface link layer process may be determined according to a design requirement. For instance, the second video interface link layer process may be a conventional link layer process complying with the HDMI standard (or other interface standards) or any other link layer process. It is noted that the coupling relationship between the circuits are shown as an example and different coupling relationships may be realized in different embodiments. For example, that the second video interface link layer circuit 150 may receive the video synchronization signal 105 through the first video interface link layer circuit 120 in other embodiments.

The second video interface physical layer circuit 160 is coupled to the second video interface link layer circuit 150 to receive the second data and the second clock. The second video interface physical layer circuit 160 may package the video data and clock data by using the second data and the second clock, thereby generating a second packet stream 108. The implementation of the second video interface physical layer circuit 160 may be determined according to a design requirement. For instance, the second video interface physical layer circuit 160 may be a conventional physical layer circuit complying with the HDMI standard (or other interface standards) or any other physical layer circuit/element. Thus, the video interface conversion apparatus 100 may convert the packet stream 101 complying with the first video interface standard (e.g., the DP interface standard or other interface standards) into the second packet stream 108 complying with the second video interface standard (e.g., the HDMI standard or other interface standards).

The video clock adjustment information generation circuit 130 is coupled to the first video interface link layer circuit 120 to receive the original synchronization signal 104. The video clock adjustment information generation circuit 130 is coupled to the video clock recovery circuit 140 to receive the video clock 107. The video clock adjustment information generation circuit 130 may generate video clock adjustment information 109 and the video synchronization signal 105 according to the original synchronization signal 104 and the video clock 107.

The video clock recovery circuit 140 is coupled to the first video interface physical layer circuit 110 to receive the original clock 103. The video clock recovery circuit 140 is coupled to the video clock adjustment information generation circuit 130 to receive the video clock adjustment information 109. The video clock recovery circuit 140 may recover the video clock 107 by adjusting the original clock 103 according to the video clock adjustment information 109. By comparing a period length of the video synchronization signal 105 with a period length of the original synchronization signal 104 defined by the control signal, the video clock adjustment information generation circuit 130 may correspondingly adjust/determine the video clock adjustment information 109. Based on the video clock adjustment information 109, the video clock recovery circuit 140 may correspondingly adjust a period length of the original clock 103 to obtain the video clock 107.

For instance, when the period length of the video synchronization signal 105 is greater than the period length of the original synchronization signal 104 defined by the control signal, the video clock recovery circuit 140 may corresponding reduce a period length of the video clock 107 based on the video clock adjustment information 109. When the period length of the video synchronization signal 105 is less than the period length of the original synchronization signal 104, the video clock recovery circuit 140 may correspondingly increase the period length of the video clock 107 of the video clock adjustment information 109.

Namely, the period length of the video clock 107 may respond to (depend upon) the original clock 103 and the video clock adjustment information 109, and the video clock adjustment information 109 may respond to (depend upon) a relationship between the original synchronization signal 104 and the video clock 107. Thus, the period length of the video clock 107 used by the second video interface link layer circuit 150 may dynamically respond to (depend upon) the period length of the original clock 103, so as to mitigate the residual issue which occurs during the process of the conversion between different video interfaces.

It is noted that the video clock adjustment information generation circuit 130 can be disposed in a variety of configurations and locations. In the embodiment illustrated in FIG. 1A, the video clock adjustment information generation circuit 130 may be an independent/separate element/circuit. In other embodiments, the video clock adjustment information generation circuit 130 may be integrated/embedded into other elements/circuits. For instance, according to a design requirement, a part or all of the video clock adjustment information generation circuit 130 may be integrated/embedded into the first video interface link layer circuit 120 and/or the video clock recovery circuit 140. In more detail, in an implementation where the video clock adjustment information generation circuit 130 is combined into the first video interface link layer circuit 120, the second video interface link layer 150 can receive the video synchronization signal 105 from the first video interface link layer circuit 120.

Figure 2A:
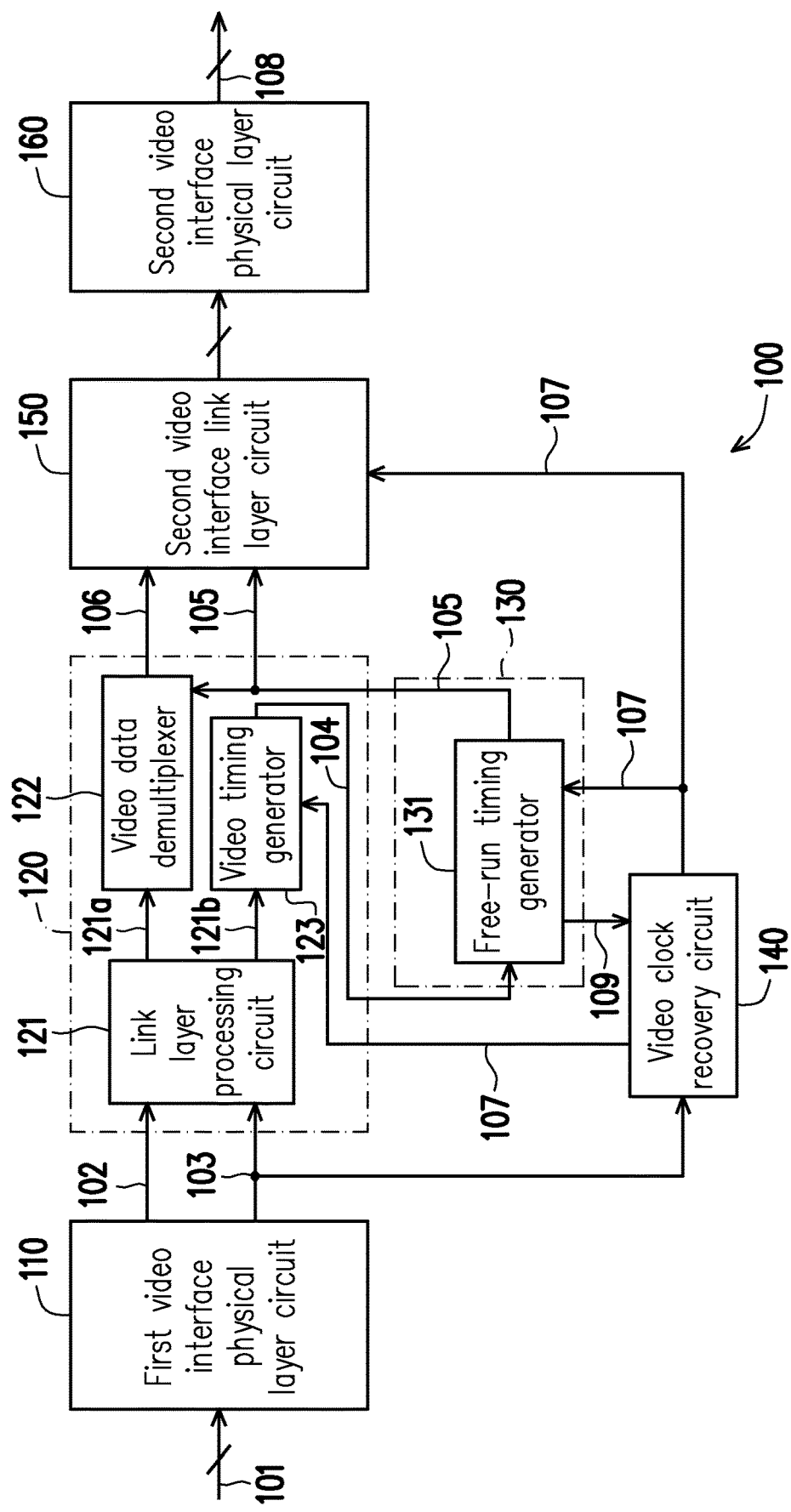
FIG. 2A is a schematic circuit block diagram illustrating the first video interface link layer circuit and the video clock adjustment information generation circuit according to an embodiment of the invention.

FIG. 2A is a schematic circuit block diagram illustrating the first video interface link layer circuit 120 and the video clock adjustment information generation circuit 130 depicted in FIG. 1A according to an embodiment of the invention. In the embodiment illustrated in FIG. 2A, the first video interface link layer circuit 120 includes a link layer processing circuit 121, a video data demultiplexer 122 and a video timing generator 123. The implementation detail of the link layer processing circuit 121 may be determined according to a design requirement. For instance, the link layer processing circuit 121 may be a link layer processing circuit complying with the DP interface standard (or other interface standards) or any other link layer processing circuit/element. In some embodiments, the link layer processing circuit 121 may include a descramble circuit, a high-bandwidth digital content protection (HDCP) receiver circuit, a stream demultiplexer circuit and/or other circuits/elements.

The link layer processing circuit 121 is coupled to the first video interface physical layer circuit 110 to receive the original data 102 and the original clock 103. The link layer processing circuit 121 may perform the first video interface link layer process on the original data 102 according to the original clock 103 to obtain a data signal 121*a* and a control signal 121*b*. In some embodiments, the data signal 121*a* may be a main stream output by a stream demultiplexer circuit (not shown) in the link layer processing circuit 121, and the control signal 121*b* may be a blank stream output by a stream demultiplexer circuit (not shown). In the same or other embodiments, the link layer processing circuit 121 may comprise descrambler, HDCP receiver, and a stream demultiplexer.

The video data demultiplexer 122 is coupled to the link layer processing circuit 121 to receive the data signal 121*a*. The video data demultiplexer 122 is coupled to the video clock adjustment information generation circuit 130 to receive the video synchronization signal 105 (e.g., a data enable signal, a horizontal synchronization signal and/or a vertical synchronization signal). The video data demultiplexer 122 may fetch the video data 106 from the data signal 121*a* according to the video synchronization signal 105 and output the video data 106 to the second video interface link layer circuit 150. The implementation detail of the video data demultiplexer 122 may be determined according to a design requirement. For instance, the video data demultiplexer 122 may be a conventional video data demultiplexer buffer complying with the DP interface standard (or other interface standards) or any other demultiplexer buffer circuit/element.

The video timing generator 123 is coupled to the link layer processing circuit 121 to receive the control signal 121*b*. The video timing generator 123 is coupled to the video clock recovery circuit 140 to receive the video clock 107. The video timing generator 123 may generate the original synchronization signal 104 according to the control signal 121*b* and output the original synchronization signal 104 to the video clock adjustment information generation circuit 130. In the present embodiment, the original synchronization signal 104 may include a data enable signal, a horizontal synchronization signal and/or a vertical synchronization signal. The implementation detail of the video timing generator 123 may be determined according to a design requirement. For instance, the video timing generator 123 may be a conventional video timing generator complying with the DP interface standard (or other interface standards) or any other timing generator circuit/element.

In the embodiment illustrated in FIG. 2A, the video clock adjustment information generation circuit 130 includes a free-run timing generator 131. The free-run timing generator 131 may generate the video synchronization signal 105 and the video clock adjustment information 109 in a free-run manner according to the original synchronization signal 104 and the video clock 107. The implementation detail of the free-run timing generator 131 may be determined according to a design requirement. For instance, the free-run timing generator 131 may be a conventional free-run timing generator or any other timing generator circuit/element. The video clock adjustment information generation circuit 130 generates the video synchronization signal 105 in a free-run manner according to a timing of the video clock 107. Thus, a phase and/or the period length of the video synchronization signal 105 may be separated from the original synchronization signal 104 and the original clock 103.

Figure 1B:
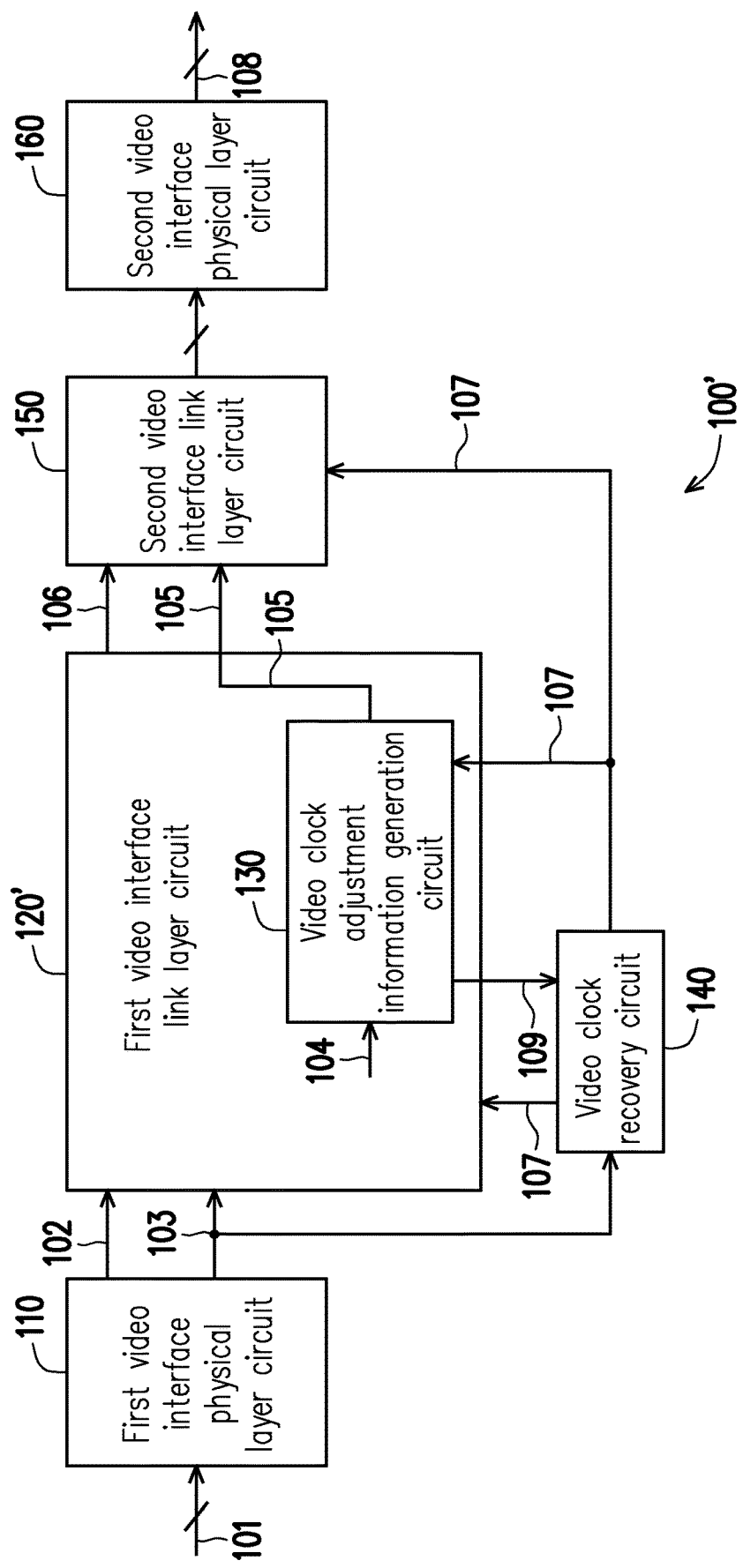

FIG. 1B is a schematic circuit block diagram illustrating a video interface conversion apparatus 100' according to another embodiment of the invention. The video interface conversion apparatus 100' includes a first video interface physical layer circuit 110, a first video interface link layer circuit 120', a video clock adjustment information generation circuit 130, a video clock recovery circuit 140, a second video interface link layer circuit 150 and a second video interface physical layer circuit 160. Details with respect to the first video interface physical layer circuit 110, the first video interface link layer circuit 120', the video clock adjustment information generation circuit 130, the video clock recovery circuit 140, the second video interface link layer circuit 150 and the second video interface physical layer circuit 160 illustrated in FIG. 1B may inferred with reference to the descriptions related to the first video interface physical layer circuit 110, the first video interface link layer circuit 120, the video clock adjustment information generation circuit 130, the video clock recovery circuit 140, the second video interface link layer circuit 150 and the second video interface physical layer circuit 160 illustrated in FIG. 1A and thus, will not be repeated.

In the embodiment illustrated in FIG. 1B where the first video interface link circuit 120' is integrated with the video clock adjustment information generation circuit 130 which generates the video synchronization signal 105, the first video interface link layer circuit 120' may also provide the video synchronization signal 105 to the second video interface link layer circuit 150. The second video interface link layer circuit 150 is coupled to the first video interface link layer circuit 120' to receive the video synchronization signal 105 and the video data 106.

Figure 2B:
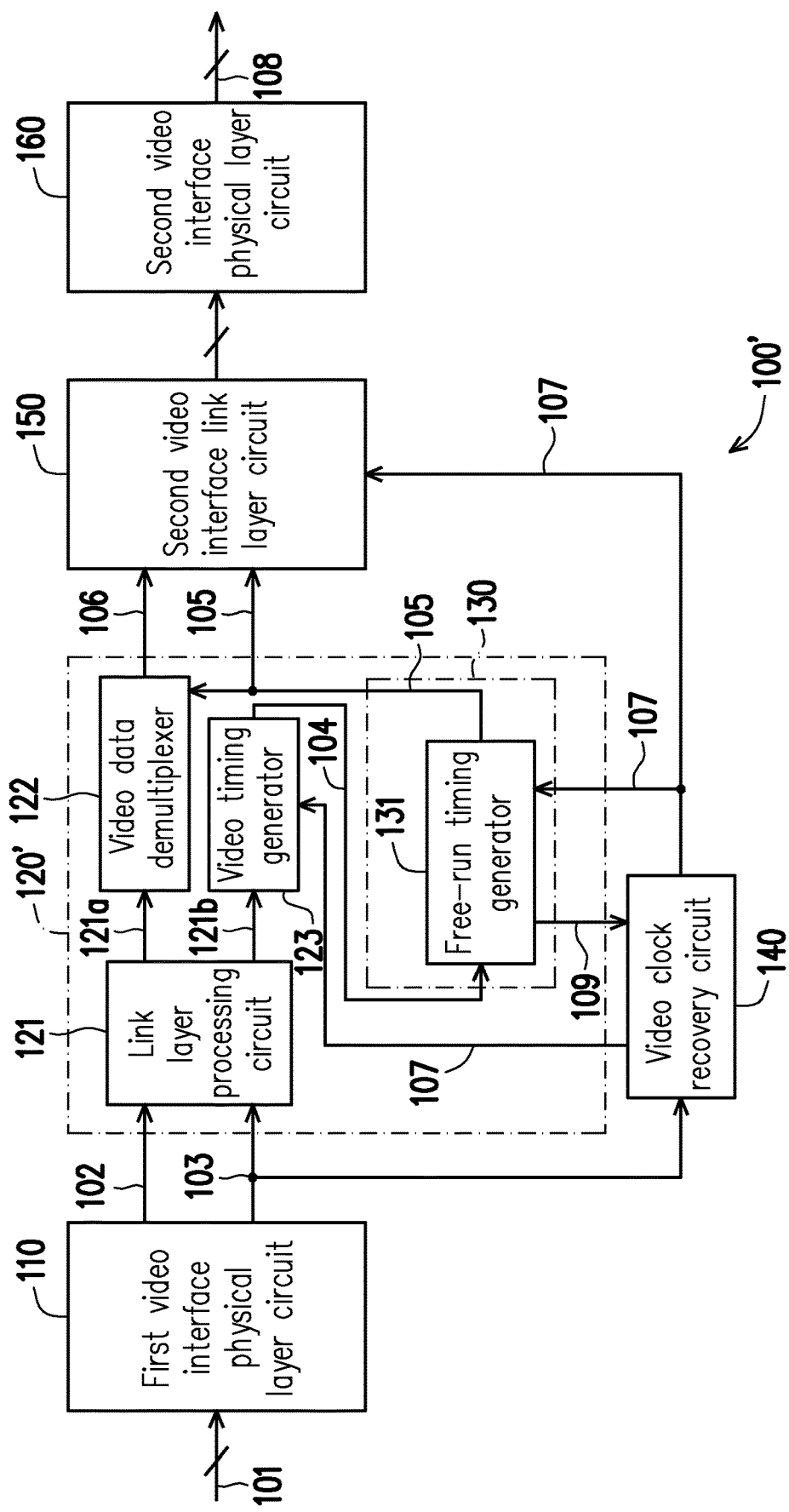
FIG. 2B is a schematic circuit block diagram illustrating the first video interface link layer circuit and the video clock adjustment information generation circuit according to an embodiment of the invention.

FIG. 2B is a schematic circuit block diagram illustrating the first video interface link layer circuit 120' and the video clock adjustment information generation circuit 130 according to an embodiment of the invention and may be applied (but not limited) to FIG. 1B. In the embodiment illustrated in FIG. 2B, the first video interface link layer circuit 120' includes a link layer processing circuit 121, a video data demultiplexer 122, a video timing generator 123 and the video clock adjustment information generation circuit 130. Details with respect to the link layer processing circuit 121, the video data demultiplexer 122, the video timing generator 123 and the video clock adjustment information generation circuit 130 illustrated in FIG. 2B may inferred with reference to the descriptions related to the link layer processing circuit 121, the video data demultiplexer 122, the video timing generator 123 and the video clock adjustment information generation circuit 130 illustrated in FIG. 2A and thus, will not be repeated.

Figure 1C:
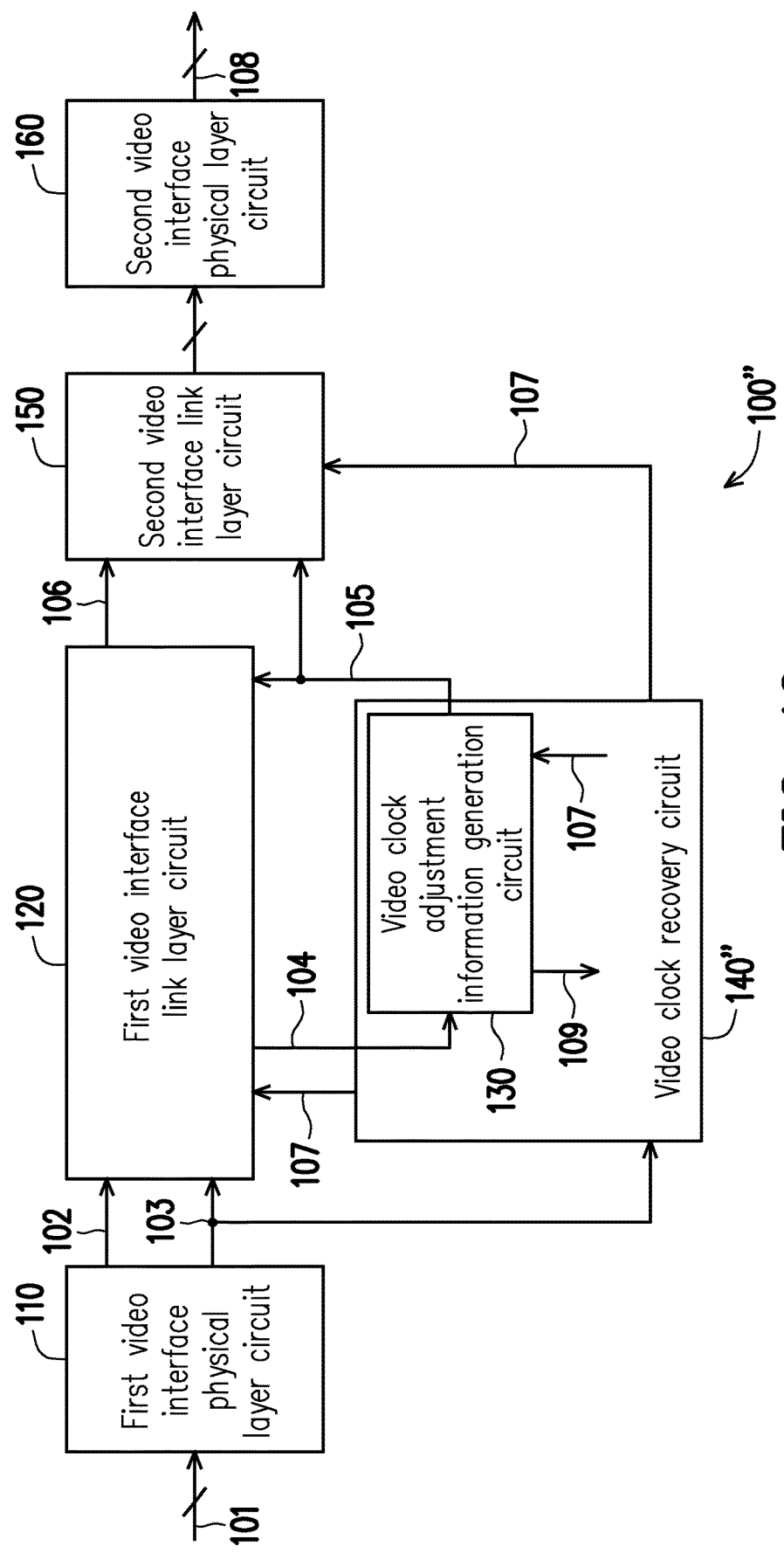

FIG. 1C is a schematic circuit block diagram illustrating a video interface conversion apparatus 100" according to another embodiment of the invention. The video interface conversion apparatus 100" includes a first video interface physical layer circuit 110, a first video interface link layer circuit 120, a video clock adjustment information generation circuit 130, a video clock recovery circuit 140", a second video interface link layer circuit 150 and a second video interface physical layer circuit 160. Details with respect to the first video interface physical layer circuit 110, the first video interface link layer circuit 120, the video clock adjustment information generation circuit 130, the video clock recovery circuit 140", the second video interface link layer circuit 150 and the second video interface physical layer circuit 160 illustrated in FIG. 1C may inferred with reference to the descriptions related to the first video interface physical layer circuit 110, the first video interface link layer circuit 120, the video clock adjustment information generation circuit 130, the video clock recovery circuit 140, the second video interface link layer circuit 150 and the second video interface physical layer circuit 160 illustrated in FIG. 1A and thus, will not be repeated.

In the embodiment illustrated in FIG. 1C where the video clock recovery circuit 140" is integrated with the video clock adjustment information generation circuit 130 which generates the video synchronization signal 105, the video clock recovery circuit 140" may also provide the video synchronization signal 105 to the first video interface link layer circuit 120 and the second video interface link layer circuit 150.

Figure 2C:
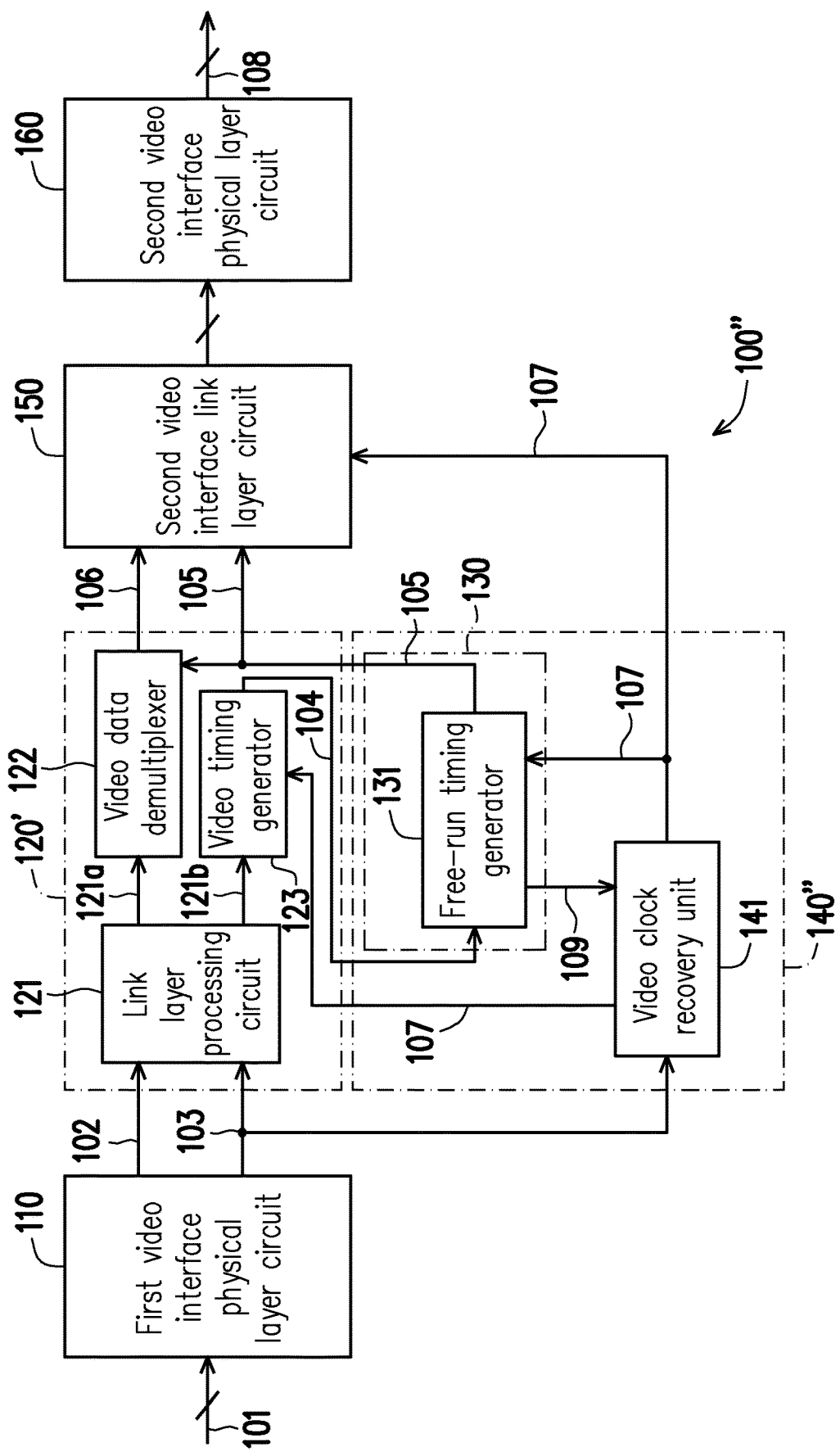
FIG. 2C is a schematic circuit block diagram illustrating the first video interface link layer circuit, the video clock adjustment information generation circuit and the video clock recovery circuit depicted in FIG. 1C according to an embodiment of the invention.

FIG. 2C is a schematic circuit block diagram illustrating a first video interface link layer circuit, a video clock adjustment information generation circuit and a video clock recovery circuit according to an embodiment of the invention and may be applied (but not limited to) to serve as the first video interface link layer circuit 120, the video clock adjustment information generation circuit 130 and the video clock recovery circuit 140" depicted in FIG. 1C. In the embodiment illustrated in FIG. 2C, the first video interface link layer circuit 120 includes a link layer processing circuit 121, a video data demultiplexer 122 and a video timing generator 123, and the video clock recovery circuit 140" includes a video clock recovery unit 141 and the video clock adjustment information generation circuit 130. Details with respect to the link layer processing circuit 121, the video data demultiplexer 122, the video timing generator 123 and the video clock adjustment information generation circuit 130 illustrated in FIG. 2C may inferred with reference to the descriptions related to the link layer processing circuit 121, the video data demultiplexer 122, the video timing generator 123 and the video clock adjustment information generation circuit 130 illustrated in FIG. 2A and thus, will not be repeated. Details with respect to the video clock recovery unit 141 illustrated in FIG. 2C may inferred with reference to the descriptions related to the video clock recovery circuit 140 illustrated in FIG. 2A and thus, will not be repeated.

Figure 3:
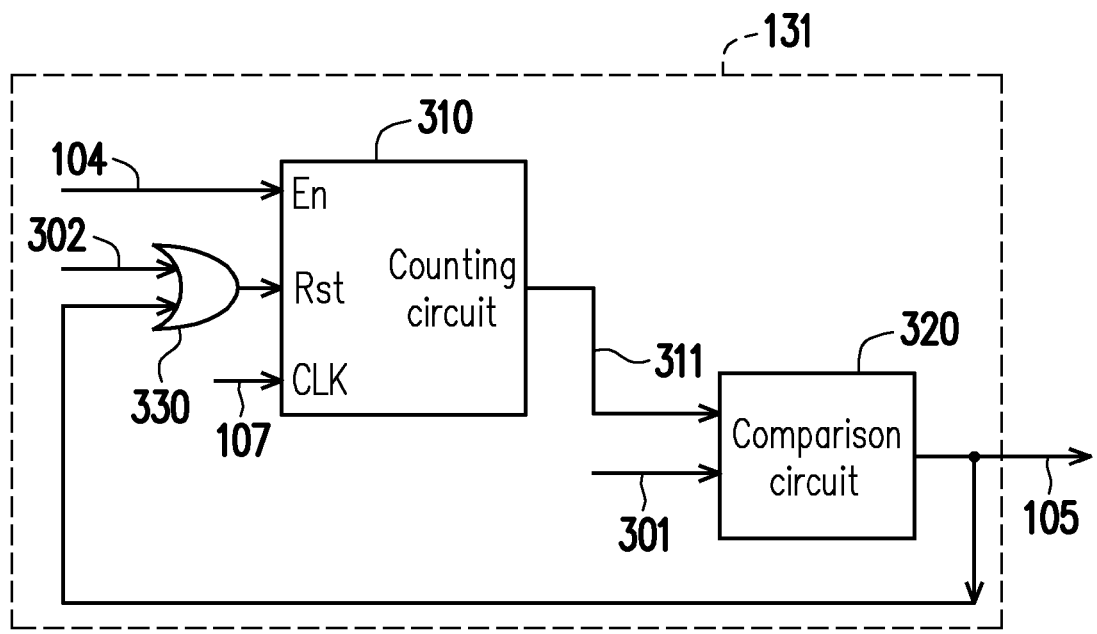
FIG. 3 is a schematic circuit block diagram illustrating the free-run timing generator depicted in FIG. 2A to FIG. 2C according to an embodiment of the invention.

FIG. 3 is a schematic circuit block diagram illustrating the free-run timing generator 131 depicted in FIG. 2A to FIG. 2C according to an embodiment of the invention. In the embodiment illustrated in FIG. 3, the free-run timing generator 131 includes a counting circuit 310, a comparison circuit 320 and an OR gate 330. The counting circuit 310 has an enable terminal En, a reset terminal Rst, a clock terminal CLK and an output terminal. The enable terminal En of the counting circuit 310 is coupled to the video timing generator 123 to receive an original vertical synchronization signal (e.g., a data enable signal, a horizontal synchronization signal or a vertical synchronization signal) from the original synchronization signal 104. The clock terminal CLK of the counting circuit 310 is coupled to the video clock recovery circuit 140 to receive the video clock 107. A first input terminal of the comparison circuit 320 is coupled to an output terminal of the counting circuit 310 to receive a count value 311 of the counting circuit 310. A second input terminal of the comparison circuit 320 receives a first threshold 301. An output terminal of the comparison circuit 320 outputs a free-run vertical synchronization signal as the video synchronization signal 105. The comparison circuit 320 may compare the count value 311 with the first threshold 301 and outputs a comparison result (i.e., the video synchronization signal 105). For instance, when the count value 311 is equal to the first threshold 301, the comparison circuit 320 pulls up a level of the video synchronization signal 105 to a logic-high level or otherwise, maintains the level of the video synchronization signal 105 at a logic-low level.

The first threshold 301 may be determined according to a design requirement. For instance, the first threshold 301 may depend upon a vertical total value and a horizontal total value, where the vertical total value and the horizontal total value are fetched from a data signal attribute packet in the packet stream 101. In some embodiments (but not limited thereto), for example, the first threshold 301 may be the vertical total value multiplied by the horizontal total value, where the vertical total value and the horizontal total value are fetched from a main stream attribute (MSA) packet in the packet stream 101. The MSA packet pertains to a conventional technique and will not repeatedly described. In some other embodiments, the first threshold 301 may be the horizontal total value.

The comparison circuit 320 may also provide the free-run vertical synchronization signal (i.e., the video synchronization signal 105) a reset terminal Rst of the counting circuit 310. A first input terminal of the OR gate 330 is coupled to the output terminal of the comparison circuit 320 to receive the free-run vertical synchronization signal (i.e., the video synchronization signal 105). A second input terminal of the OR gate 330 receives a control enable signal 302. When a level of the control enable signal 302 is a logic-high level, the OR gate 330 may block the free-run vertical synchronization signal (i.e., the video synchronization signal 105) from being transmitted to the reset terminal Rst of the counting circuit 310, i.e., the free-run timing generator 131 is disabled. When the level of the control enable signal 302 is a logic-low level, the OR gate 330 may transmit the free-run vertical synchronization signal (i.e., the video synchronization signal 105) to the reset terminal Rst of the counting circuit 310, i.e., the free-run timing generator 131 is enabled.

Figure 4:
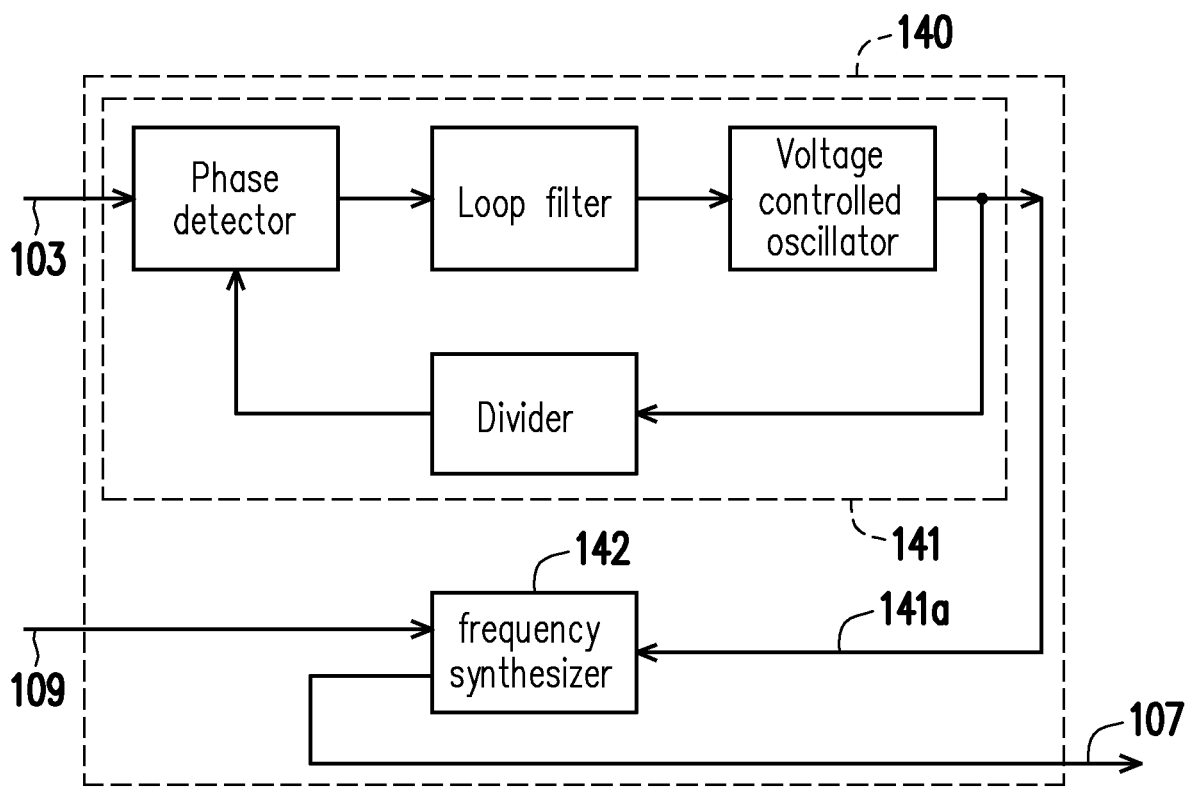
FIG. 4 is a schematic circuit block diagram illustrating the video clock recovery circuit depicted in FIG. 1A and FIG. 2A according to an embodiment of the invention.

FIG. 4 is a schematic circuit block diagram illustrating the video clock recovery circuit 140 depicted in FIG. 1A and FIG. 2A according to an embodiment of the invention. In the embodiment illustrated in FIG. 3, the video clock recovery circuit 140 includes a phase-locked loop 141 and a frequency synthesizer 142. The phase-locked loop 141 receives the original clock 103. The phase-locked loop 141 may generate an internal clock 141a according to the original clock 103. The implementation detail of the phase-locked loop 141 may be determined according to a design requirement. For instance, the phase-locked loop 141 may be a conventional phase-locked loop or any other clock generation circuit/element. In the embodiment illustrated in FIG. 4, the phase-locked loop 141 includes a phase detector, a loop filter, a voltage controlled oscillator and a divider. If it is assumed that a ratio of the divider is 1/N (where N is a real number), a frequency of the internal clock 141a is N times a frequency of the original clock 103.

The frequency synthesizer 142 is coupled to the phase-locked loop 141 to receive the internal clock 141a. The frequency synthesizer 142 may determine a ratio according to the video clock adjustment information 109 and correspondingly adjust the frequency of the internal clock 141a according to the ratio to generate the video clock 107 to the first video interface link layer circuit 120, the video clock adjustment information generation circuit 130 and the second video interface link layer circuit 150. The implementation of the frequency synthesizer 142 may be determined according to a design requirement. For instance, the frequency synthesizer 142 may be a conventional frequency synthesizer or any other frequency synthesizer circuit/element. If it is assumed that the ratio determined by the frequency synthesizer 142 according to the video clock adjustment information 109 is A.B (where A is an integer, and B is a decimal or a floating-point number), a frequency of the video clock 107 is (A.B) times the frequency of the internal clock 141a. If the frequency of the internal clock 141a is N times the frequency of the original clock 103, the frequency of the video clock 107 is (N*A.B) times the frequency of the original clock 103. Thus, video clock recovery circuit 140 may dynamically adjust the period length of the video clock 107 according to the video clock adjustment information 109. Namely, the period length of the video clock 107 may dynamically respond to the period length of the original clock 103, thereby mitigating the residual issue which occurs during the process of the conversion between different video interfaces.

Figure 5:
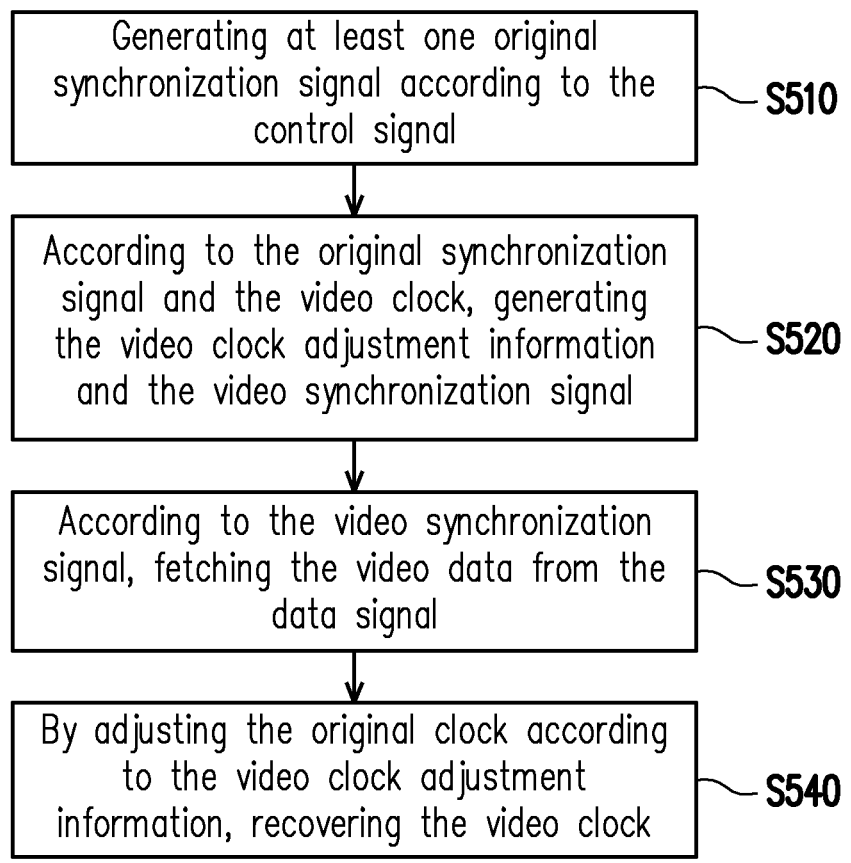
FIG. 5 is a flowchart illustrating an operation method of a video interface conversion apparatus according to an embodiment of the invention.

FIG. 5 is a flowchart illustrating an operation method of a video interface conversion apparatus according to an embodiment of the invention. In step S510, a video interface circuit generates at least one original synchronization signal 104 according to the control signal 121b. The video interface circuit may be the first video interface link layer circuit 120 illustrated in FIG. 1A and FIG. 2A, or the video data demultiplexer 122 and the video timing generator 123 illustrated in FIG. 2A. In step S520, the video clock adjustment information generation circuit 140 generates the video clock adjustment information 109 and the video synchronization signal 105 according to the original synchronization signal 104 and the video clock 107. In step S530, the video interface circuit fetches the video data 106 from the data signal 121a according to the video synchronization signal 105. In step S540, the video clock recovery circuit 140 recovers the video clock 107 by adjusting the original clock 103 according to the video clock adjustment information 109. Details with respect to steps S510 to S540 may inferred with reference to the descriptions related to the embodiments illustrated in FIG. 1A to FIG. 4 and thus, will not be repeated.

Figure 6:
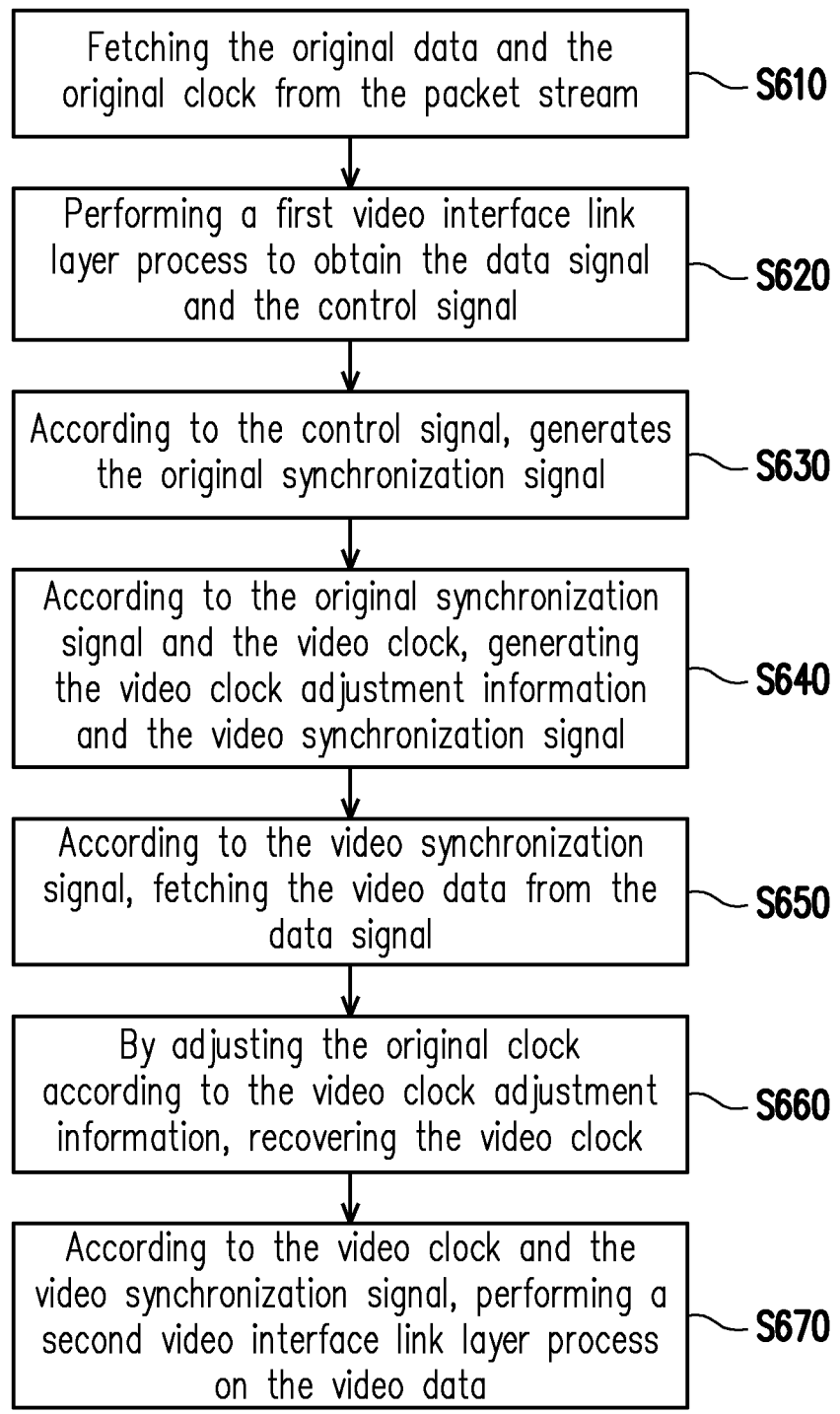
FIG. 6 is a flowchart illustrating an operation method of a video interface conversion apparatus according to another embodiment of the invention.

FIG. 6 is a flowchart illustrating an operation method of a video interface conversion apparatus according to another embodiment of the invention. In step S610, the first video interface physical layer circuit 110 fetches the original data 102 and the original clock 103 from the packet stream 101. In step S620, the first video interface link layer circuit 120 performs a first video interface link layer process on the original data 102 according to the original clock 103 to obtain the data signal 121a and the control signal 121b. In step S630, the first video interface link layer circuit 120 generates at least one original synchronization signal 104 according to the control signal 121b. In step S640, the video clock adjustment information generation circuit 130 generates the video clock adjustment information 109 and the video synchronization signal 105 according to the original synchronization signal 104 and the video clock 107. In step S650, the first video interface link layer circuit 120 fetches the video data 106 from the data signal 121a according to the video synchronization signal 105. In step S660, the video clock recovery circuit 140 recovers the video clock 107 by adjusting the original clock 103 according to the video clock adjustment information 109. In step S670, the second video interface link layer circuit 150 performs a second video interface link layer process on the video data 106 according to the video clock 107 and the video synchronization signal 105. Details with respect to steps S610 to S670 may be inferred with reference to the descriptions related to the embodiments illustrated in FIG. 1A to FIG. 4 and thus, will not be repeated.

It should be noted that in various application scenarios, related functions of the first video interface link layer circuit 120, the video clock adjustment information generation circuit 130, the video clock recovery circuit 140 and/or the second video interface link layer circuit 150 may be implemented as software, firmware or hardware by using general purpose programming languages (e.g., C or C++), hardware description languages (e.g., Verilog HDL or VHDL) or other suitable programming languages. The programming languages capable of executing the functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The programming languages may be stored in the computer-accessible media for a processor of the computer to access/execute the programming codes of the software (or firmware). In the hardware implementation, the functions of the embodiments of the invention can be implemented or executed by one or more controllers, microcontrollers, microprocessors, application-specific integrated circuits (ASICs), digital signal processors (DSPs), field programmable gate array (FPGAs) and/or other various logical blocks, modules and circuits of other processing units. In addition, the device and the method of the invention can be implemented through a combination of hardware and software.

In light of the foregoing, in the video interface conversion apparatus and the operation method thereof provided by the embodiments of the invention, the video clock adjustment information generation circuit generates the video clock adjustment information to the video clock recovery circuit according to the original synchronization signal and the video clock. The video clock recovery circuit can recover the video clock by adjusting the original clock according to the video clock adjustment information. Thus, the period length of the recovered video clock can dynamically respond to the period length of the original clock, so as to mitigate the residual issue which occurs during the process of the conversion between different video interfaces.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A video interface conversion apparatus, comprising:
   a first video interface physical layer circuit, configured to fetch original data and an original clock;
   a first video interface link layer circuit, coupled to the first video interface physical layer circuit to receive the original data and the original clock, and configured to perform a first video interface link layer process on the original data according to the original clock to obtain a data signal and a control signal, wherein the control signal is a blank stream, wherein the first video interface link layer circuit generates at least one original synchronization signal according to the control signal, and fetches video data from the data signal according to a video synchronization signal;
   a video clock adjustment information generation circuit, configured to generate video clock adjustment information and the video synchronization signal in response to the original synchronization signal and a video clock, wherein the video synchronization signal is provided to the first video interface link layer circuit;
   a video clock recovery circuit, coupled to the first video interface physical layer circuit to receive the original clock, and configured to recover the video clock by adjusting the original clock in response to the video clock adjustment information, wherein the recovered video clock is provided at least to the video clock adjustment information generation circuit, wherein the video clock recovery circuit is configured to adjust a period length of the original clock based on the video clock adjustment information by comparing a period length of the video synchronization signal and a period length of the at least one original synchronization signal defined by the control signal; and
   a second video interface link layer circuit, coupled to the first video interface link layer circuit to receive the video data and the video synchronization signal, coupled to the video clock recovery circuit to receive the video clock, and configured to perform a second video interface link layer process on the video data according to the video clock and the video synchronization signal.

2. The video interface conversion apparatus according to claim 1, wherein the video clock recovery circuit comprises:
   a phase-locked loop, configured to receive the original clock, and configured to generate an internal clock according to the original clock; and
   a frequency synthesizer, coupled to the phase-locked loop to receive the internal clock, and configured to determine a ratio according to the video clock adjustment information and correspondingly adjusts the internal clock to generate the video clock according to the ratio.

3. The video interface conversion apparatus according to claim 1, wherein the first video interface link layer circuit comprises:
   a link layer processing circuit, coupled to the first video interface physical layer circuit to receive the original data and the original clock, and configured to perform the first video interface link layer process on the original data according to the original clock to obtain the data signal and the control signal;
   a video timing generator, coupled to the link layer processing circuit to receive the control signal, and configured to generate the at least one original synchronization signal according to the control signal; and
   a video data demultiplexer, coupled to the link layer processing circuit to receive the data signal, and configured to fetch the video data from the data signal according to the video synchronization signal.

4. The video interface conversion apparatus according to claim 1, wherein the video clock adjustment information generation circuit comprises:
   a free-run timing generator, configured to generate the video synchronization signal and the video clock adjustment information in a free-run manner according to the at least one original synchronization signal and the video clock.

5. The video interface conversion apparatus according to claim 4, wherein the free-run timing generator comprises:
   a counting circuit, having an enable terminal, a reset terminal, a clock terminal and a output terminal, wherein the enable terminal of the counting circuit is coupled to the video timing generator to receive an original vertical synchronization signal among the at least one original synchronization signal, and the clock terminal of the counting circuit is coupled to the video clock recovery circuit to receive the video clock; and
   a comparison circuit, having a first input terminal, a second input terminal and a output terminal, wherein the first input terminal of the comparison circuit is coupled to the output terminal of the counting circuit to receive a count value of the counting circuit, the second input terminal of the comparison circuit receives a first threshold, and the output terminal of the comparison circuit outputs a free-run vertical synchronization signal served as the video synchronization signal and provides the free-run vertical synchronization signal to the reset terminal of the counting circuit.

6. The video interface conversion apparatus according to claim 5, wherein the first threshold depends upon a vertical total value and a horizontal total value, and the vertical total value and the horizontal total value are fetched from a data signal attribute packet.

7. A video interface conversion apparatus, comprising:
   a video interface circuit, configured to generate at least one original synchronization signal according to a control signal, and configured to fetch video data from a data signal according to a video synchronization signal, wherein the control signal is a blank stream;
   a video clock adjustment information generation circuit, configured to generate video clock adjustment information and the video synchronization signal in response to the original synchronization signal and a video clock, wherein the video synchronization signal is provided to the video interface circuit; and
   a video clock recovery circuit, configured to receive an original clock and the video clock adjustment info, illation, and configured to recover the video clock by adjusting the original clock in response to the video clock adjustment information, wherein the recovered video clock is provided at least to the video clock adjustment information generation circuit,
   wherein the video clock recovery circuit is configured to adjust a period length of the original clock based on the video clock adjustment information by comparing a period length of the video synchronization signal and a period length of the at least one original synchronization signal defined by the control signal.

8. The video interface conversion apparatus according to claim 7, wherein the video interface circuit comprises:

a video interface link layer circuit, configured to receive original data and the original clock, perform a video interface link layer process on the original data according to the original clock to obtain the data signal and the control signal.

9. The video interface conversion apparatus according to claim 7, wherein the video interface circuit further comprises:
a video interface physical layer circuit, configured to fetch original data and the original clock.

10. An operation method of a video interface conversion apparatus, comprising:
fetching original data and an original clock by a first video interface physical layer circuit;
performing a first video interface link layer process on the original data according to the original clock to obtain a data signal and a control signal by a first video interface link layer circuit, wherein the control signal is a blank stream;
generating at least one original synchronization signal according to the control signal by the first video interface link layer circuit;
generating video clock adjustment information and a video synchronization signal in response to the original synchronization signal and a video clock by the video clock adjustment information generation circuit, wherein the video synchronization signal is provided to the first video interface link layer circuit;
fetching video data from the data signal according to the video synchronization signal by the first video interface link layer circuit;
recovering the video clock by adjusting the original clock in response to the video clock adjustment information by a video clock recovery circuit, comprising:
comparing a period length of the video synchronization signal and a period length of the at least one original synchronization signal defined by the control signal; and
adjusting a period length of the original clock based on the video clock adjustment information by the video clock recovery circuit, wherein the recovered video clock is provided at least to the video clock adjustment information generation circuit; and
performing a second video interface link layer process on the video data according to the video clock and the video synchronization signal by a second video interface link layer circuit.

11. An operation method of a video interface conversion apparatus, comprising:
generating at least one original synchronization signal according to a control signal and fetching video data from a data signal according to a video synchronization signal by a video interface circuit, wherein the control signal is a blank stream;
generating video clock adjustment information and the video synchronization signal in response to the original synchronization signal and a video clock by a video clock adjustment information generation circuit, wherein the video synchronization signal is provided to the video interface circuit; and
recovering the video clock by adjusting the original clock in response to the video clock adjustment information by a video clock recovery circuit, comprising:
comparing a period length of the video synchronization signal and a period length of the at least one original synchronization signal defined by the control signal; and
adjusting a period length of the original clock based on the video clock adjustment information by the video clock recovery circuit, wherein the recovered video clock is provided at least to the video clock adjustment information generation circuit.

12. An operation method of a video interface conversion apparatus, comprising:
generating an original synchronization signal by a first video interface link layer circuit;
generating video clock adjustment information and a video synchronization signal in response to the original synchronization signal and a video clock by a video clock adjustment information generation circuit, wherein the video synchronization signal is provided to the first video interface link layer circuit;
recovering the video clock by adjusting an original clock in response to the video clock adjustment information by a video clock recovery circuit, comprising:
comparing a period length of the video synchronization signal and a period length of the at least one original synchronization signal; and
adjusting a period length of the original clock based on the video clock adjustment information by the video clock recovery circuit, wherein the recovered video clock is provided at least to the video clock adjustment information generation circuit; and
providing the video clock to a second video interface link layer circuit.

* * * * *